L. A. WILSON.
POWER TRANSMITTING UNIT FOR MOTOR DRIVEN VEHICLES.
APPLICATION FILED APR. 3, 1919.
1,411,467.
Patented Apr. 4, 1922.
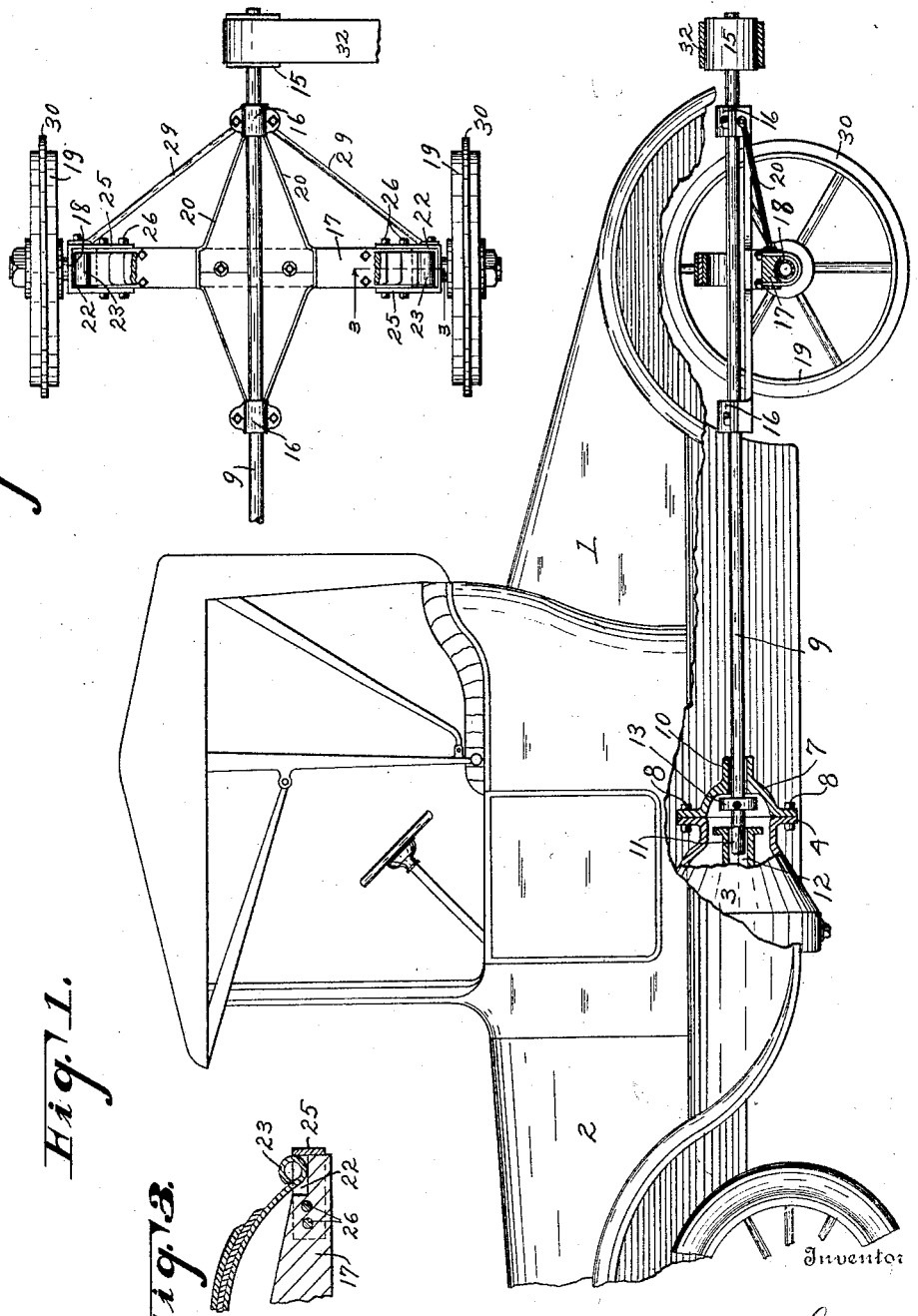

UNITED STATES PATENT OFFICE.

LESLIE A. WILSON, OF BERLIN, WISCONSIN.

POWER-TRANSMITTING UNIT FOR MOTOR-DRIVEN VEHICLES.

1,411,467. Specification of Letters Patent. Patented Apr. 4, 1922.

Application filed April 3, 1919. Serial No. 287,239.

*To all whom it may concern:*

Be it known that I, LESLIE A. WILSON, a citizen of the United States, residing at Berlin, county of Green Lake, and State of Wisconsin, have invented new and useful Improvements in Power-Transmitting Units for Motor-Driven Vehicles, of which the following is a specification.

My invention relates to improvements in power transmitting units for motor driven vehicles.

The object of my invention is to provide means whereby a motor driven vehicle can be quickly converted into a relatively stationary power plant for driving other machinery, and the ordinary clutch mechanism and the transmission mechanism of the vehicle utilized to control the transmission of the power.

My invention is particularly adapted for use in connection with what are known as Ford cars, in which the assembly is such that the rear wheels with their axle, differential gears and transmission shaft may be readily removed by uncoupling the spring shackles, and detaching the universal joint housing.

In the drawings:—

Figure 1 is a side elevation of a motor driven vehicle with my improved power unit attached in position for use.

Figure 2 is a plan view of my improved power unit, showing also a fragment of the rear spring of the vehicle.

Figure 3 is a sectional view, drawn on line 3—3 of Figure 2.

Like parts are identified by the same reference characters throughout the several views.

The body 1 and forward portion 2 of the motor driven vehicle illustrated may be assumed to be of the ordinary construction of a so-called Ford coupe. 3 is the rear portion of the transmission case, this case having an outwardly extending annular flange 4, to which the front end of the transmission shaft housing is bolted when the vehicle is in its normal condition, said housing having an enlargement at its front end adapted to contain the universal joint commonly employed.

By uncoupling the rear spring from the vehicle axle, and by uncoupling the transmission shaft housing from the flange 4, it is possible to remove the rear wheels of the vehicle, together with the axle, differential gear, the transmission shaft and its housing without disturbing or disconnecting any of the other portions of the vehicle. Thereupon, I apply a bearing cap 7 to the flange 4, and connect it thereto by bolts 8. A shaft 9 has bearings in the tubular portion 10 of the cap, and has a squared front end 11 adapted to fit within a squared socket at the rear end of the intermediate shaft section 12, which constitutes the direct drive member of the variable speed mechanism, and is in clutch connection with the engine shaft, substantially as in all ordinary motor driven vehicles.

A collar 13 is secured to the shaft 9 within the cap 7 to prevent the shaft 9 from slipping out of the cap.

The rear end of the shaft 9 is provided with a pulley 15, and the shaft is supported by bearings 16 carried by a rear axle bar 17, to the under surface of which a tubular axle 18 is secured. The wheels 19 are mounted upon the ends of the tubular axle 18, and the bearing members 16 are supported from the axle bar 17 by rods 20.

The axle bar 17 is mortised at its respective ends to form sockets 22, adapted to receive the eyes 23 of a transversely disposed vehicle spring, normally employed to support the rear end of the vehicle body from the rear axle. By removing the coupling bolts, these spring eyes may be disengaged from the vehicle axle, and may then be loosely supported in the sockets 22.

The axle bar 17 is preferably formed of wood, and the sockets 22 are preferably formed by mortising the ends of the bar 17 to form a channel, open at the end of the bar, and then closing the end of this channel by a metallic strip 25, the arms of which extend along the side of the axle bar, and are secured thereto by bolts 26. Braces 29 connect the respective ends of the axle bar with the bearing members 16, as clearly shown in Figure 2.

The wheels 19 are preferably provided with rims having radially projecting annular flanges 30, adapted to cut into the ground and prevent the machine from shifting laterally under the stress of a power transmitting belt 32, applied to pulley 15 for the purpose of driving other machinery.

From the foregoing description, it will be apparent that my improved power unit illustrated in Figure 2, may be applied to a vehicle of the type illustrated in Figure 1, by merely jacking up the body of the vehicle, uncoupling the spring eyes 23 and also uncoupling the transmission shaft casing from the flange 4 of the variable speed casing, after which the entire rear portion of the running gear, i. e., the rear wheels, driving axles, differential gears, and transmission shaft, together with the axle and gear casings and transmission shaft casing, may be bodily removed, and the power unit illustrated in Figure 2 substituted therefor. The vehicle body may then be lowered and the spring eyes adjusted in the sockets 22, and the bearing member 7 secured to the flange 4 by the bolts 8. The vehicle engine may then be utilized to drive the belt 32 through the medium of the pulley 15, and the clutch mechanism and variable speed mechanism of the vehicle can be utilized to control the power transmission.

The entire vehicle may be moved from place to place by attaching a team of horses or employing another motor driven vehicle as a tractor.

I claim:—

1. In a power transmission unit for motor driven vehicles the combination of an axle bar, wheels loosely mounted thereon, shaft bearings supported from the bar, a transmission shaft extending across the line of the axle bar and journaled in said bearings, a pulley on said shaft, and means for coupling the front end of said shaft in operative relation to a vehicle motor clutch and variable speed mechanism, said unit being adapted to be substituted for the rear axle wheels and associated driving connections of a motor driven vehicle.

2. A power transmission unit adapted to be substituted for the driving wheels and axle of a motor vehicle, including the combination of a non-tractive support for the vehicle frame and body, a substitute transmission shaft provided with bearings in said support, a pulley on said shaft in the rear of the support, and means for detachably coupling said shaft to the prime mover of the vehicle through the clutch and variable speed mechanism thereof.

3. A non-tractive, power transmission unit adapted to be substituted interchangeably for the rear wheels and driving connections of a motor vehicle, said unit comprising a support for the body of the vehicle, a transmission shaft adapted to replace the transmission shaft of the vehicle, and bearings for said shaft carried by said support.

4. A power transmission unit for motor driven vehicles, including the combination with a support for the rear portion of the vehicle body, adapted to be substituted for the vehicle wheels and their driving connections, a substitute transmission shaft carried by said support, and provided with a pulley on the rear end portion thereof, and means for detachably coupling said transmission shaft to the driven shaft of the vehicle clutch and variable speed mechanism, said support being provided with sockets adapted to receive the ends of the vehicle springs.

5. A power transmission unit for motor driven vehicles, including the combination with a support for the rear portion of the vehicle body, adapted to be substituted for the vehicle wheels, and their driving connections, a substitute transmission shaft carried by said support, and provided with a pulley on the rear end portion thereof, means for detachably coupling said transmission shaft to the driven shaft of the vehicle clutch and variable speed mechanism, said support being provided with sockets adapted to receive the ends of the vehicle springs, and said support being provided with wheels, whereby the vehicle may be drawn from place to place with said power transmission unit supporting the rear portion thereof.

6. A power transmission unit for motor driven vehicles, including the combination of the vehicle, its motor, clutch, variable speed mechanism, and intermediate driven shaft member, a detachable support adapted to be substituted for the rear wheels and their associated supporting and driving connections, a transmission shaft carried by said support, and adapted to be coupled to said intermediate motor driven shaft member, and substituted for the ordinary transmission shaft employed to drive the rear wheels of the vehicle, and a pulley on said substitute transmission shaft, adapted for use in connection with a belt for driving other mechanisms.

7. A power transmission unit for motor driven vehicles, including the combination of the vehicle, its motor, clutch, variable speed mechanism, and intermediate driven shaft member, a detachable support adapted to be substituted for the rear wheels and their associated supporting and driving connections, a transmission shaft carried by said support, and adapted to be coupled to said intermediate motor driven shaft member, and substituted for the ordinary transmission shaft employed to drive the rear wheels of the vehicle, and a pulley on said substitute transmission shaft, adapted for use in connection with a belt for driving other mechanisms, said substitute support comprising a set of rear wheels, a non-rotatable axle bar connecting said wheels, and means connected with said axle bar for loosely engaging and positioning the body supporting rear springs of the vehicle while the substitute support and transmission shaft are in use.

In testimony whereof I affix my signature in the presence of two witnesses.

LESLIE A. WILSON.

Witnesses:
M. J. PAUL,
N. M. PAUL.